United States Patent
Kim et al.

[11] Patent Number: 6,041,027
[45] Date of Patent: *Mar. 21, 2000

[54] OPTICAL PICKUP FOR USING DISKS EACH HAVING A DIFFERENT THICKNESS

[75] Inventors: Jin-hwan Kim; Min-ho Jang, both of Kyonggi-do, Rep. of Korea

[73] Assignee: Samsung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/931,288

[22] Filed: Sep. 16, 1997

[30] Foreign Application Priority Data

Sep. 16, 1996 [KR] Rep. of Korea ............... 96-40179

[51] Int. Cl.[7] ................ G11B 7/00; G02B 5/32
[52] U.S. Cl. ................ 369/44.24; 369/44.27; 369/120; 359/15
[58] Field of Search .................. 369/112, 120, 369/44.23, 44.37, 94, 118, 44.24, 44.27, 44.29, 44.41, 44.42, 54, 58; 359/15

[56] References Cited

U.S. PATENT DOCUMENTS

| | | | |
|---|---|---|---|
| 5,523,993 | 6/1996 | Freeman | 369/109 |
| 5,793,734 | 8/1998 | Tsuchiya et al. | 369/112 |
| 5,802,037 | 9/1998 | Lee et al. | 369/120 |

*Primary Examiner*—Cassandra Spyrou
*Assistant Examiner*—Jared Treas
*Attorney, Agent, or Firm*—Sughrue, Mion, Zinn, Macpeak & Seas, PLLC

[57] ABSTRACT

An optical pickup capable of use with disks each having a different thickness, including two optical modules each having a light source having a different wavelength, and a photodetector for receiving reflected light. The optical pickup selects a proper light source out of two light sources each having a different wavelength, according to the type of disk and the information which is to be reproduced, and records/reproduces information stored in the disk under optimum conditions according to the thickness of the disk.

10 Claims, 4 Drawing Sheets

OPTICAL PICKUP FOR USING DISKS EACH HAVING A DIFFERENT THICKNESS

BACKGROUND OF THE INVENTION

1. Field of the Invention

The present invention relates to an optical pickup for optically reading/writing information from/on an optical recording medium, and particularly to an optical pickup for use with disks each having a different thickness.

2. Description of the Related Art

A compact disk (CD), which is widely known as an optical recording medium, has a substrate thickness of 1.2 mm. As a recording layer, it includes a reflection surface for reflecting optical light, and the information on sounds, characters, graphics, etc. is stored in a number of pits formed in the reflection surface. Recently, a digital video disk (DAD) having a substrate thickness of 0.6 mm, which is capable of storing a large quantity of video information at a high density has been developed. An optical pickup for a DAD uses an optical light having short wavelength and collects light by an objective lens having a large numerical aperture (NA), thereby forming a small spot for reproduction at a high density. In the case of reproducing information stored in a CD by the optical pickup for a DAD, the reproduction is actually difficult, as the spherical aberration of the recording surface increases due to the difference in thicknesses of the substrates, and thus, the reproducing signals are degraded.

Conventionally, several kinds of optical pickups for use with disks each having a different thickness, have been supplied in compliance with the users' request. The conventional optical pickup for use with disks each having a different thickness, use a light source of a short wave length of 650 nm, and has a device for adjusting the numerical aperture of the objective lens according to the thickness of disk whose information is to be reproduced. In other words, when reproducing information stored in a DAD, a small spot is formed using the numerical aperture of 0.6 for the objective lens. When reproducing information stored in a CD, the spherical aberration is corrected by adjusting the numerical aperture to 0.45 using a part of the objective lens having a small numerical aperture, i.e., a part nearby the axis, or by restricting the beam diameter of the light incident upon the objective lens from the light source.

Nowadays, as a recording medium capable of reproducing information which is already recorded once, a CD-R is practically used. Moreover, the CD-R is required to be compatible with the aforesaid CD and DAD. For reference, the thickness of a CD-R is m, which is the same as the CD. Its recording layer is made of a phase-variable material in which the reflexibility of the recording wavelength and the reproducing wavelength are changed in a specific wavelength band. Also, the information stored in a CD-R can be reproduced in an optical pickup environment, similar to the environment where the information stored in a CD is reproduced.

However, as the conventional environment of the optical pickup for using disks each having a different thickness adopts a light source of short wavelength, it is not proper to reproduce the information stored in the CD-R.

Additionally, in the conventional optical pickup, as the optical environment conforms with the thin DAD, the information stored in the CD cannot be reproduced under optimum conditions.

SUMMARY OF THE INVENTION

Therefore, it is an object of the present invention to provide an optical pickup capable of use with disks each having a different thickness and of use with disks made from different recording materials.

It is another object of the present invention to provide an optical pickup capable of use with disks each having a different thickness and capable of recording/reproducing information on/from disks under optimum conditions.

According to the present invention, an optical pickup for use with disks each having a different thickness, includes: first and second light sources for generating light each having a different wavelength; an objective lens for collecting light radiated from the first and second light sources on disks each having a different thickness; an optical path control unit for controlling an optical path so that the light radiated from the first and second light sources can be incident on the objective lens; a unit for adjusting a radiation angle of the first and second light sources to restrictedly adjust the effective numerical aperture of the object lens; and first and second detecting units for receiving each reflected light from disks each having a different thickness and detecting electrical signals.

Preferably, the first and second light sources are located so that their optical axes can be rectangularly arranged. The optical path control unit includes a beam splitter which transmits light radiated from one light source and reflects light radiated from the other light source.

More preferably, the unit for adjusting a radiation angle restricts the radiation angle of the light so that the light radiated from one light source out of the first and second light sources can pass the part nearby the axis of the objective lens.

The first detecting unit includes a photodetector for receiving a reflected light and detecting an electrical signal therefrom; and a hologram plate having a hologram for transmitting light outputted from the first light source and diffracting the reflected light on the photodetector. Preferably, the first light source includes a surface emitting laser diode and it is located on the same substrate as the photodetector.

Moreover, the second detecting unit includes a photodetector for receiving the reflected light and detecting an electrical signal therefrom; a grating for diffracting the light outputted from the second light source; and a hologram plate having a hologram for diffracting the reflected light on the photodetector. Preferably, the second light source includes the surface emitting laser diode and it is located on the same substrate as the photodetector.

More preferably, another pickup according to the present invention further includes an optical power monitoring unit for detecting a signal informing a variation in optical power from at least one part of the light outputted from the light sources, to maintain a predetermined optical power for each first and second light source. More preferably, the optical power monitoring unit includes a beam splitter for partially transmitting and partially reflecting light received from both sides at the intersection of the optical axes; and a photodetector for a monitor for receiving the light which is partially transmitted and partially reflected and detecting electrical signals therefrom.

BRIEF DESCRIPTION OF THE DRAWINGS

A more complete appreciation of the present invention, and many of the attendant advantages thereof, will become readily apparent by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

The optical pickup for use with disks each having a different thickness according to the present invention, includes selecting a proper light source out of two light sources each having a different wavelength, according to the type of disk and the information which is to be reproduced, and recording/reproducing information stored in the disk under optimum conditions according to the thickness of the disk.

Figure 1:
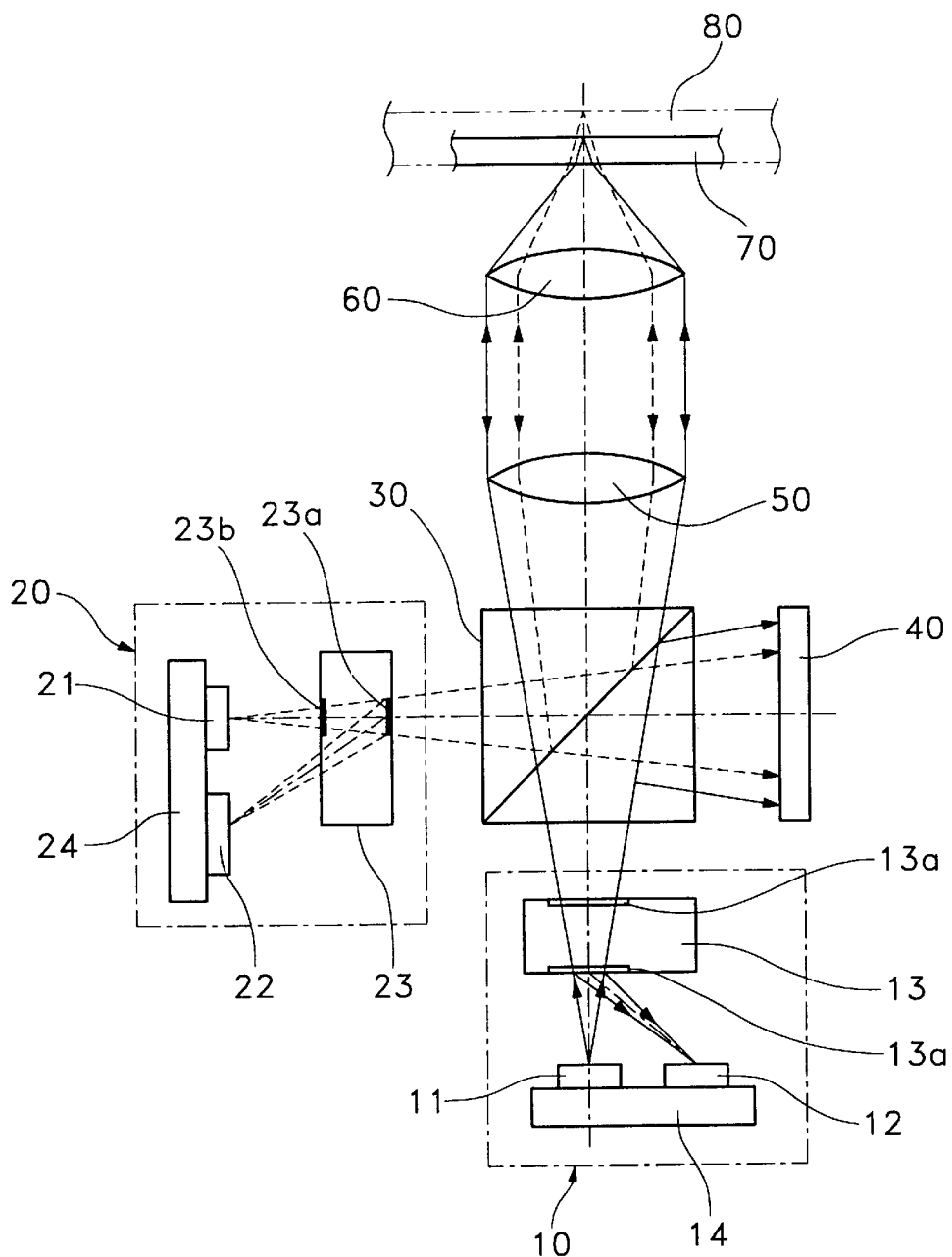
FIG. 1 is a layout illustrating an optical construction of a recording/reproducing optical pickup for using disks each having a different thickness according to the present invention.

Referring to FIG. 1, the optical pickup for using disks each having a different thickness according to an embodiment of the present invention, includes: two optical modules 10 and 20; a beam splitter 30; a photodetector 40 for a monitor; a collimating lens 50; and an objective lens 60. Reference numerals 70 and 80 are disks each having a different thickness. In other words, the disk 70 having a thin substrate is a DAD, and the disk 80 having a thick substrate is the aforesaid CD or CD-R. One of the two disks is loaded on the focusing surface of the objective lens 60 for recording or reproducing.

The two optical modules 10 and 20 have a first light source and a second light source, respectively. The first and second light sources generate light each having a different wavelength, and they are located so that their optical axes can be crossed at right angles. The first light source 11 is for reproducing the disk 70 having a thin substrate, and the second light source 21 is for reproducing the disk 80 having a thick substrate. The optical modules 10 and 20 each includes a photo-detecting unit for detecting signals for controlling a position of the objective lens 60 from the light reflected from the disks 70 and 80. The photo-detecting unit includes the first and second photodetectors 12 and 22 for detecting electrical signals from the reflected light; and first and second hologram plates 13 and 23 having holograms 13a and 23a, respectively, for diffracting the reflected light on the photodetectors 12 and 22, respectively. For reference, the first light source 11 is located on the same substrate 14 as the first photodetector 12. Similarly, the second light source 21 is located on the same substrate 24 as the second photodetector 22.

The beam splitter 30 is a device for controlling the optical path so that the light outputted from the first and second light sources 11 and 21 can be incident upon the objective lens 60. The beam splitter 30 is made by arranging two rectangular prisms, and it is located at the intersection of the optical axes of the two optical modules 10 and 20. This beam splitter 30 partially reflects and partially transmits light received from both sides, and divides the light into two beams toward the photodetector 40 for a monitor and the objective lens 60. By coating a special thin film on all sides of the beam splitter 30, transmission ratio and reflection ratio for each wavelength can be adjusted.

The photodetector 40 for a monitor maintains the optical power for the optical modules 10 and 20, and it detects electrical signals informing a variation of the optical power from a part of the light received from the beam splitter 30. Accordingly, by controlling driving voltages (or, currents) of the light sources 11 and 21 based upon the detected signals, a proper optical power can be maintained. The photodetector 40 for monitor is used both for the first and second light sources 11 and 21 of the optical modules 10 and 20.

The collimating lens 50 converts light incident upon the objective lens 60 through the beam splitter 30 into a parallel beam which proceeds parallel to the optical axis.

The objective lens 60 focuses light incident from the light sources 11 and 21 of the optical modules 10 and 20, and forms spots on corresponding disks 70 and 80. The objective lens 60 is supported by a conventional lens driving device (not illustrated) so as to be driven vertically and horizontally to the surface of disk, and it is moved so that the position error can be compensated based upon a focus and track control signal detected from the detection signals of the photodetectors 12 and 22.

In the optical pickup for use with disks each having a different thickness, the optical module 10 of one side is used for reproducing information stored in the disk 70 having a thin surface such as a DAD for high density, and the optical module 20 of the other side is used for reproducing information stored in the disk 80 having a thick surface such as a CD or CD-R.

Figure 3:
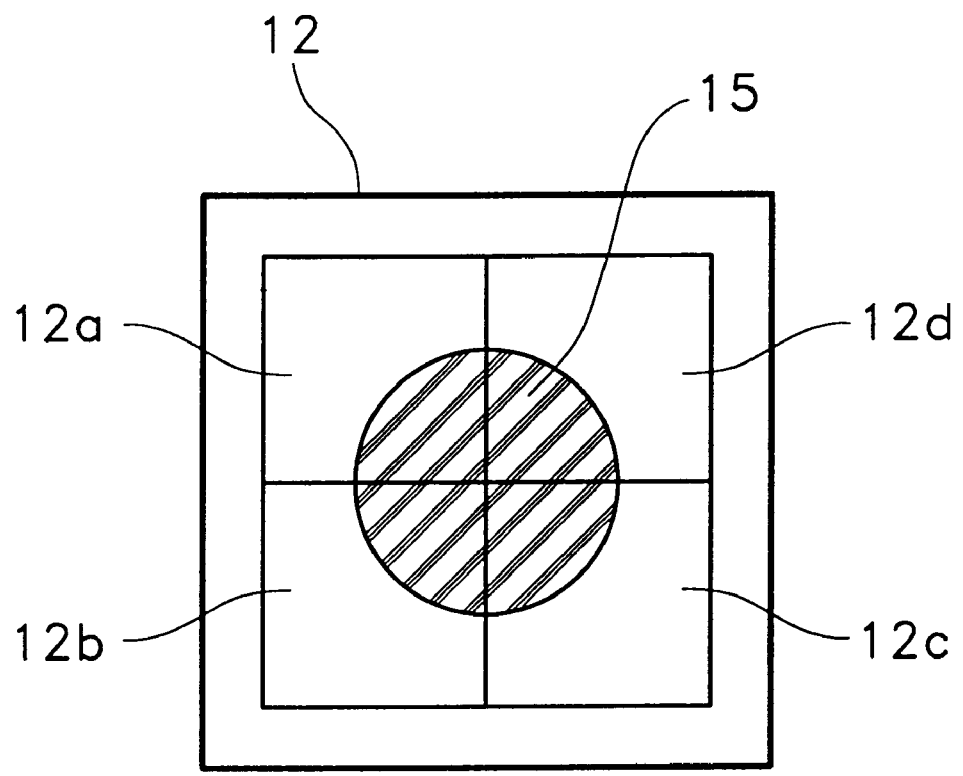
FIG. 3 is a plan view illustrating a photodetector of a first light source shown in FIG. 1.

First, in the optical module 10 for reproducing the information stored in the thin disk 70, the first light source 11 uses surface emitting laser diode (SEL) having a wavelength of 650 nm, and the numerical aperture of the objective lens 60 is set as 0.6. As shown in FIG. 3, the photodetector 12 of the photo-detecting unit bisects the spot 15 vertically and horizontally, and uses a 4-divisioned photodetector having four divided regions 12a–12d. An astigmatism using the hologram 13a is performed to detect a focus error signal of the objective lens 60 related to the disk 70 having a thin surface, and a differential phase detection (DPD) by a signal beam is performed to detect a track error signal. That is, a single spot 15 which is reflected on the disk 70 and then diffracted by the hologram 13a is formed on the photodetector 12. This spot is shown as a circle when the focus is adjusted as illustrated in FIG. 3, and it is varied into an oval or a straight line according to the degree of vibration in the event that the disk 70 is vertically vibrated. On the other hand, in the event that the disk 70 is horizontally vibrated, the phase difference is changed according to the variation of depth of pits on both sides. As a result, the optical quantity is also changed. Accordingly, assuming that signals detected from the divided regions 12a to 12d are Sa to Sd, the signals can be detected in a following way:

focus error signal: $S_{FE}=(Sa+Sc)-(Sb+Sd)$;

track error signal: $S_{TE}$=phase of $(Sa+Sc)$–phase of $(Sb+Sd)$; and reproducing signal: $S_{RF}=Sa+Sb+Sc+Sd$.

Figure 2:
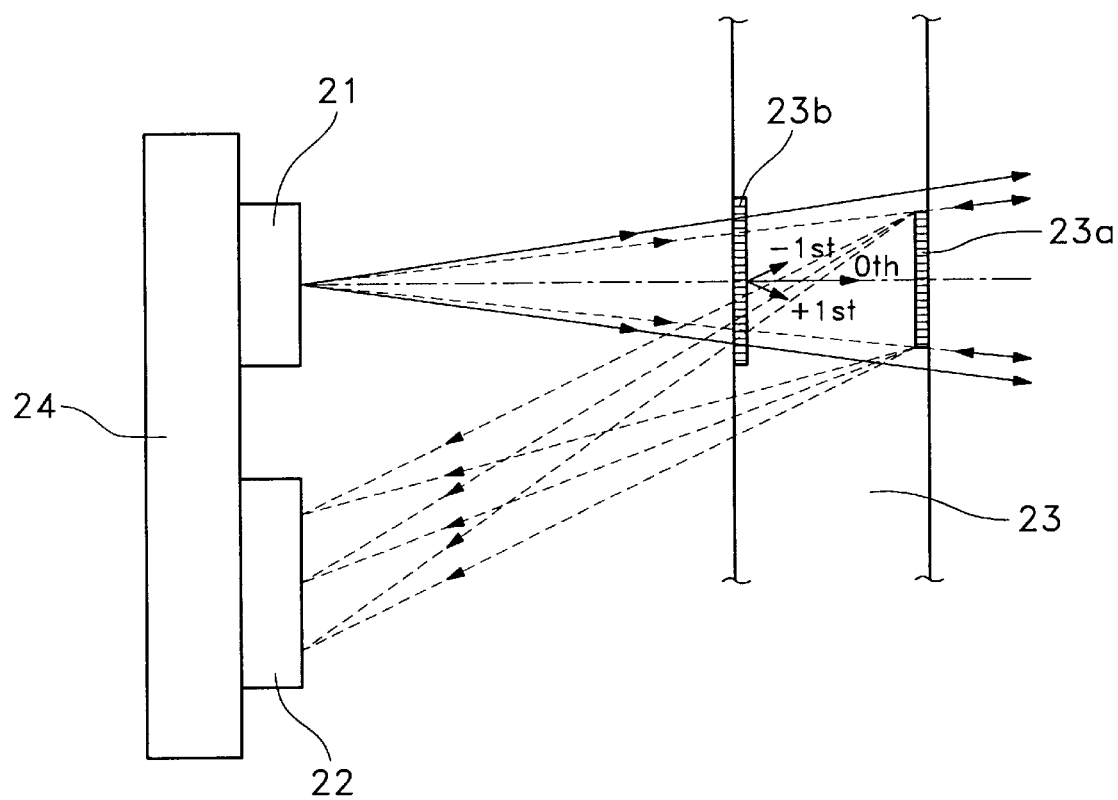
FIG. 2 is a diagram particularly illustrating an optical path of an optical module shown in FIG. 1.
Figure 4:
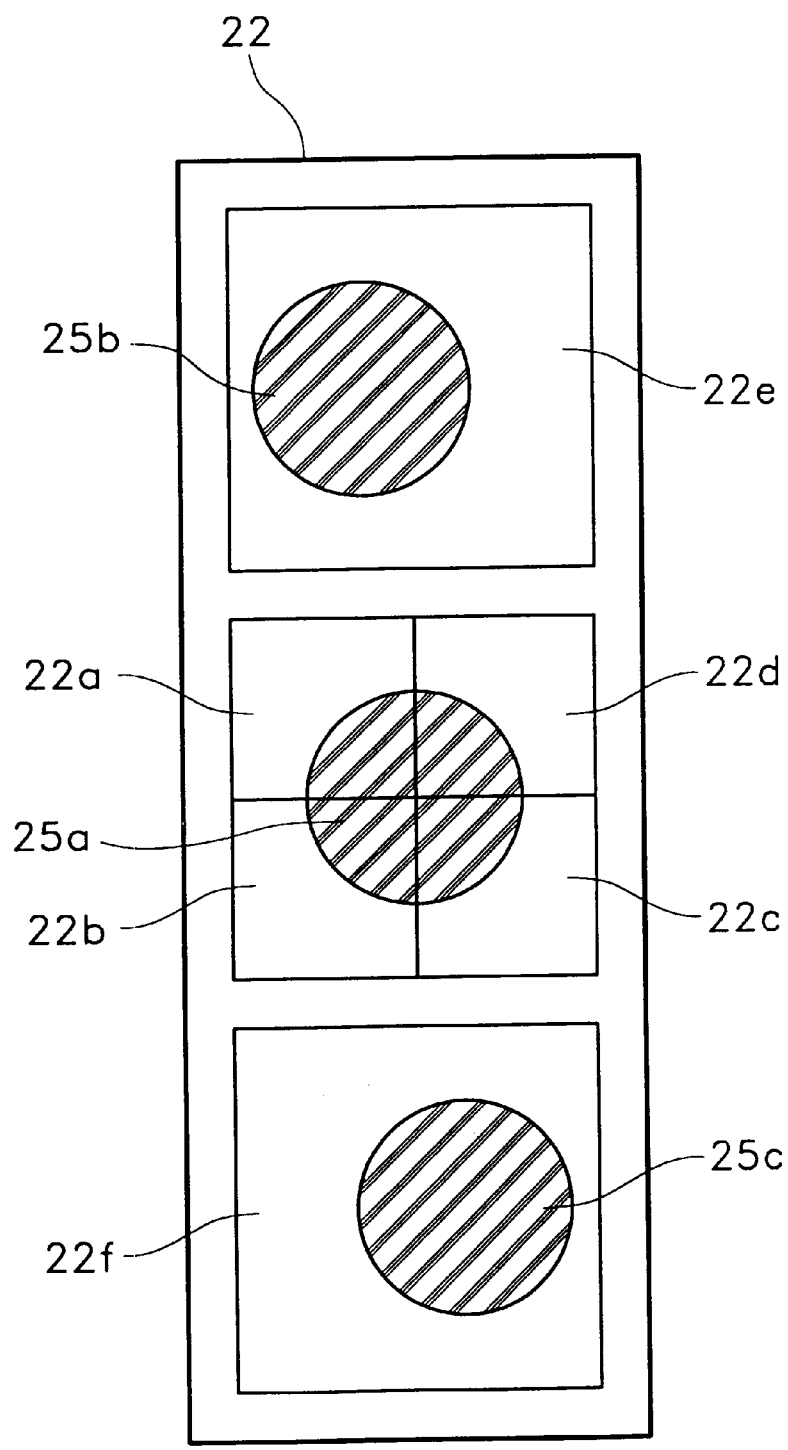
FIG. 4 is a plan view illustrating a photodetector of a second light source shown in FIG. 1.

Next, in the optical module 20, the second light source 21 uses SEL having a wavelength of 780 nm, and the effective numerical aperture NA is restrictedly adjusted to 0.45. By decreasing the radiation angle of the light outputted from the second light source 21, it is possible to restrict the numerical aperture of the objective lens 60. Also, in order to restrict the numerical aperture, the size of a light emitting hole of the SEL can be adjusted. The diameter of the optical beam used in the actual reproduction, as shown in FIG. 1, passes through the part nearby the axis of the objective lens 60, and it is possible to form a spot having a lessened spherical aberration due to the difference in thickness. As shown in FIG. 4, the photodetector 22 of the photo-detecting unit uses a 6-divisioned photodetector having six divided regions 22*a* to 22*f*. To detect the focus error signal of the objective lens 60 regarding the disk 80, an astigmatism using the hologram 23*a* is performed. To detect the track error signal, a grating 23*b* is formed on the hologram plate 23, as shown in FIG. 2, and a 3-beam method by 0th, +1st and −1st order diffracted lights which are diffracted by the grating 23*b* is performed. In order words, as shown in FIG. 4, three spots 25*a*, 25*b* and 25*c* are formed on the photodetector 22 by the diffracted light, signals of which are as follows:

focus error signal: $S_{FE}=(Sa+Sc)-(Sb+Sd)$;

track error signal: $S_{TE}=Se-Sf$; and reproducing signal: $S_{RF}=Sa+Sb+Sc+Sd$.

As described above, the optical pickup of the present invention for use with disks each having a different thickness overcomes the problem of increase in the aberration caused by the difference in thickness of the disks. Additionally, as light sources each having a different wavelength are used, data can be reproduced without any loss even in disks having different recording materials, thereby enhancing the efficiency and establishing an optimum optical environment by a wavelength suitable to each disk.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An optical pickup for use with disks each having a different thickness, comprising:

first and second optical modules, said first and second optical modules comprising:

first and second light sources, respectively, for generating light each having a different wavelength;

first and second detecting means, respectively, for each receiving reflected light from said disks which each have a different thickness, said first and second detecting means for detecting electrical signals;

an objective lens for collecting light radiated from said first and second light sources and focusing said light on said disks each having a different thickness;

optical path control means for controlling an optical path so that the light radiated from said first and second light sources can be incident on said objective lens; and means for adjusting a radiation angle of said first and second light sources using said first and second optical modules to restrict the effective numerical aperture of said objective lens.

2. The optical pickup of claim 1, wherein said first and second light sources are located so that their optical axes are crossed at right angles, and said optical path control means comprises a beam splitter which transmits light radiated from one light source and reflects light radiated from the other light source.

3. The optical pickup of claim 1, wherein said means for adjusting a radiation angle restricts the radiation angle of the light so that the light radiated from one light source out of said first and second light sources can pass the part nearby the axis of said objective lens.

4. The optical pickup of claim 1, wherein said first detecting means, comprises:

a photodetector for receiving a reflected light and detecting an electrical signal therefrom; and a hologram plate having a hologram for transmitting light outputted from said first light source and diffracting the reflected light on said photodetector.

5. The optical pickup of claim 4, wherein said first light source includes a surface emitting laser diode and said diode is located on the same substrate as said photodetector.

6. The optical pickup of claim 1, wherein said second detecting means comprises:

a photodetector for receiving reflected light and detecting an electrical signal therefrom;

a grating for diffracting light outputted from said second light source; and a hologram plate having a hologram for diffracting the reflected light on said photodetector.

7. The optical pickup of claim 6, wherein said second light source includes a surface emitting laser diode and said diode is located on the same substrate as said photodetector.

8. The optical pickup of claim 1, further comprising:

optical power monitoring means for detecting a signal informing a variation of an optical power from at least one part of the light outputted from said light sources to maintain a predetermined optical power of each first and second light source.

9. The optical pickup of claim 8, wherein said first and second light sources are located so that their optical axes are crossed at right angles, and said optical power monitoring means comprises: a beam splitter for partially transmitting and partially reflecting light received from both sides at the intersection of the optical axes; and a photodetector for a monitor for receiving the light which is partially transmitted and partially reflected and detecting electrical signals therefrom.

10. The optical pickup of claim 1, further comprising:

a collimating lens for converting light incident upon said objective lens from said first and second light sources into a parallel beam.

* * * * *